US011376540B2

(12) United States Patent
Carver, Sr. et al.

(10) Patent No.: US 11,376,540 B2
(45) Date of Patent: Jul. 5, 2022

(54) FILTER MEDIA FOR A DRUM FILTER

(71) Applicant: Engineered Recycling Systems, LLC, Atlanta, GA (US)

(72) Inventors: Michael P. Carver, Sr., Glen Ellyn, IL (US); Andreas Fischer, Ann Arbor, MI (US)

(73) Assignee: Engineered Recycling Systems, LLC, Atlanta, GA (US)

( * ) Notice: Subject to any disclaimer, the term of this patent is extended or adjusted under 35 U.S.C. 154(b) by 0 days.

(21) Appl. No.: 16/492,853

(22) PCT Filed: Mar. 22, 2019

(86) PCT No.: PCT/US2019/023678
§ 371 (c)(1),
(2) Date: Sep. 10, 2019

(87) PCT Pub. No.: WO2020/197538
PCT Pub. Date: Oct. 1, 2020

(65) Prior Publication Data
US 2022/0001320 A1 Jan. 6, 2022

(51) Int. Cl.
*B01D 46/24* (2006.01)
*B01D 46/00* (2022.01)

(52) U.S. Cl.
CPC ..... *B01D 46/2403* (2013.01); *B01D 46/0005* (2013.01); *B01D 2265/025* (2013.01); *B01D 2271/02* (2013.01)

(58) Field of Classification Search
CPC ....... B29D 5/08; B29D 5/10; Y10T 24/44043; Y10T 24/4406; B01D 46/2403;
(Continued)

(56) References Cited

U.S. PATENT DOCUMENTS 3,306,457 A 2/1967 Putnam
3,440,696 A * 4/1969 Staller .................. B29D 5/10
24/DIG. 39
(Continued)

FOREIGN PATENT DOCUMENTS

DE 4432004 2/1997
DE 10164080 4/2007

OTHER PUBLICATIONS

International Search Report and Written Opinion in corresponding PCT Application No. PCT/US2019/023678, dated Jun. 10, 2019.

*Primary Examiner* — Robert Clemente
(74) *Attorney, Agent, or Firm* — Andrus Intellectual Property Law, LLP

(57) ABSTRACT

Filter media for a drum filter that includes a plurality of annular frame members, each annular frame member having a circumference is disclosed. The filter media includes a filter sheet with first and second engagement strips having a cord portion and an attachment tab portion connected to the filter sheet. The first and second engagement strips engage with first and second connecting strips located on the annular frame members. Each connecting strip has a receiving portion that receives the cord portion of the associated engagement strip. Each connecting strip also has a body portion configured to engage a drum filter frame. An engagement mechanism configured to attach a filter sheet to a drum filter frame is also disclosed. A system for attaching a filter media to a cylindrical drum filter is also disclosed. When the first and second engagement strips are fully received in the first and second connecting strips, the filter media extends between the first annular frame member and second annular frame member and along the first and second circumferential edges to enclose a first cylindrical filter space.

17 Claims, 6 Drawing Sheets

(58) Field of Classification Search
CPC .... B01D 46/681; B01D 46/682; B01D 46/10; B01D 46/0005; B01D 2265/025; B01D 2271/02

See application file for complete search history.

(56) References Cited

U.S. PATENT DOCUMENTS

| | | | | |
|---|---|---|---|---|
| 3,979,194 | A | * | 9/1976 | Wiser ..................... B01D 50/20 55/296 |
| 4,140,503 | A | * | 2/1979 | Vandergriff ........ B01D 46/0056 55/290 |
| 4,154,588 | A | * | 5/1979 | Herndon, Jr. ........ B01D 46/682 55/294 |
| 4,209,311 | A | * | 6/1980 | Deeg ..................... B01D 46/24 55/505 |
| 5,112,485 | A | | 5/1992 | Hirs |
| 6,560,827 | B1 | * | 5/2003 | Gross ..................... A47C 17/84 5/120 |
| 2010/0032383 | A1 | | 2/2010 | Gaiser et al. |
| 2010/0088864 | A1 | | 4/2010 | Duer |
| 2015/0374074 | A1 | * | 12/2015 | Martinson ................ B29D 5/10 264/176.1 |

* cited by examiner

FILTER MEDIA FOR A DRUM FILTER

CROSS-REFERENCE TO RELATED APPLICATIONS

This application claims priority from International Application PCT/IB2019/023678, filed Mar. 22, 2019.

FIELD

The present application relates to filter dust collection systems, and particularly to filter media used in such systems.

BACKGROUND

Filter dust collection systems, and particularly drum filter dust collection systems are used for energy efficient filtration of large volumes of air to remove fibrous dust such as wood, polystyrene, insulation material, natural material, etc. from the air and replace it with clean air. A typical drum filter of the type contemplated in the present application is stationary and can be bolted directly to a wall opening. The incoming air flows from the inside to the outside, leaving the drum through the whole filter surface. Rotating and changing suction nozzles inside of the drum continuously vacuum any dust and waste from the filter media. Little air is required to clean the filter medium as the suction nozzles are efficient. The nozzles are fluidic optimized and touch the filter media, which guarantees high and efficient cleaning.

A typical drum filter includes a plurality of annular frame members, each annular frame member having a first circumferential edge and a second opposed circumferential edge along the circumference of the annular member. The plurality of annular members are coaxially spaced from one another by a distance defining a cylindrical peripheral frame and an inner cylindrical filter space that may be internally loaded. The cylindrical peripheral frame may be enclosed in an outer rectangular support frame, and the outer rectangular support frame typically supports additional components to effect filtration, such components including, but not limited to: dust conveying fans to move air through the filtration system; a regenerative pre-filter unit for extracting dust from large air volumes prior to entering the inner cylindrical filter space; a compacting power screw for compacting and discharging fine dust and material with short fibers without letting those substances contaminate the surrounding area; a fiber compactor for paper and plastic waste; high efficiency cyclone separators for creating a rotating airflow (vortex) to separate dust particles; and misting systems to saturate the air being cleaned.

Conventional filter media sheets have a length dimension and a width dimension. The width dimension approximates the distance between the annular frame members and the length dimension approximates the circumference of the annular frame members. Thus, the filter media sheets are configured such that each sheet surrounds the space between two coaxially spaced annular frame members to enclose the inner cylindrical filter space. It is important that the filter media sheet used on the cylindrical peripheral frame to filter the inner cylindrical filter space on the above-described filters is fastened very tightly between the coaxial rings to ensure no dust is escaping during the filtration process. Prior to the present invention, this was achieved by attaching the filter media to the annular members using nails, self-drilling screws and tension straps, along with mallets, pliers and wrenches. After attaching the filter medium to the annular member, the two ends of the filter media sheet are then connected to a fastening rail.

A problem with this approach is that the filter media repeatedly slips during assembly using the tools. Additionally, the pointed ends of the nails and self-drilling screws pose a risk of injury (e.g. ripping or tearing) to the filters. In conventional systems, once the media was placed around the entire circumference of the cylindrical frame via the nails, it is then tightened to the respective annular members by means of tension straps. All of this typically requires multiple technicians and substantial time because two people are required to replace the filter media, and do so with the use of a ladder, because the annular rings can reach 2.5 meters in height. Due to the challenges posed by this current process, the filter media is not always properly applied to the annular members, causing some of the dust-filled air to escape before being properly cleaned.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present application is first directed to a filter media for a drum filter. The drum filter includes a plurality of annular frame members, each annular frame member having a circumference. The filter media includes a filter sheet having a length dimension and a width dimension. The length dimension has a first end and a second end, and the width dimension has a first side and a second side. The width dimension of the filter sheet approximates a distance between annular frame members of the drum filter. The length dimension of the filter sheet approximates a circumference of the annular frame members of the drum filter. In certain embodiments a handle is attached to one of the first end or the second end of the filter media sheet. The handle allows a technician to move the first and second engagement strips through the first and second connecting strips, as described herein. The handle may be attached at a location equidistant between the first side and the second side, or at any other location permitting the technician to move the first and second engagement strips through the first and second connecting strips as described herein.

A first engagement strip extends along the first side of the filter sheet between the first end and the second end. The first engagement strip has a cord portion and an attachment tab extending from the cord portion. The cord portions may have a circular or non-circular cross sectional shape. The attachment tab is connected to the first side of the filter sheet. A second engagement strip extends along the second side of the filter sheet between the first end and the second end. Like the first engagement strip, the second engagement strip has a cord portion and an attachment tab extending from the cord portion. The attachment tab of the second engagement strip is connected to the second side of the filter sheet. The first and second sides of the filter sheet have a first edge and second edge and the cord portions of the first and second engagement strips extend outwardly from the first and second edges, respectively.

The filter media of the present application also includes a first connecting strip that is configured to receive the first engagement strip, and a second connecting strip that is configured to receive the second engagement strip. Each connecting strip has a receiving portion that receives the cord portion of the associated engagement strip. Each connecting strip also has a body portion configured to engage a drum filter frame, and specifically and annular frame member of the drum filter frame. The receiving portions of the first and second connecting strips have an inner surface and an outer surface. The receiving portions of the first and second connecting strips may further comprise a connecting ridge extending upwardly from the inner surface and a terminal end defining receiving space with a cross sectional shape corresponding to the cross section of the cord portion. In one embodiment the cross sectional shape of the receiving space is generally C-shaped. The connecting ridge and the terminal end define a separation space separating the terminal end from the connecting ridge. The separation space receives a portion of the attachment tab adjacent the cord portion. In certain embodiments, the body portion of the first and second connecting strips have a downwardly facing lip configured to engage a circumferential edge of an annular frame member the drum filter frame.

Other embodiments of the present application contemplate an engagement mechanism configured to attach a filter sheet to a drum filter frame. The engagement mechanism includes an engagement strip and a connecting strip. The engagement strip has a length, a cord portion extending along the length, and an attachment tab extending from the cord portion. The cord portion has a cross sectional shape that may be circular or non-circular. The engagement strip is configured to be connected to the filter sheet, and the length of the engagement strip approximates a length of a filter sheet that the engagement strip is configured to be attached thereto. The connecting strip has a length that is commensurate with the length of the engagement strip, an inner surface, and an outer surface. The connecting strip also has a connecting rail with a receiving portion for receiving the cord portion of the engagement strip, and a body portion. The lower surface of the body portion is configured to engage a drum filter frame. The connecting strip may include a connecting ridge extending upwardly from the inner surface and a terminal end defining a receiving space corresponding to the cord portion. The connecting ridge and the terminal end also define a separation space separating the terminal end from the connecting ridge, and the separation space receives a portion of the attachment tab adjacent the cord portion. In certain embodiments, the body portion of the first and second connecting strips have a downwardly facing lip configured to engage a circumferential edge of an annular frame member the drum filter frame.

The present application also contemplates a system for attaching a filter media to a cylindrical drum filter. The drum filter has a plurality of annular frame members, and each annular frame member has a circumference with a first circumferential edge and a second opposed circumferential edge. The plurality of annular members are coaxially spaced from one another by a distance. The plurality of annular frame members define a cylindrical periphery and an inner cylindrical filter space.

The system includes a filter sheet having a length dimension and a width dimension. The length dimension has a first end and a second end, while the width dimension has a first side and a second side. The first side defines a first edge and the second side defines a second edge. The width dimension approximates the distance between the annular frame members, and the length dimension approximates the circumference of the annular frame members. Accordingly, the filter media sheet is configured to span the distance between two coaxially spaced annular frame members to enclose the inner cylindrical filter space.

The system includes a first engagement strip extending along the first side of the filter sheet from the first end to the second end. The first engagement strip has a cord portion located adjacent the first side of the filter sheet that extends outwardly from the first edge. The cord portion has a cross sectional shape that may be circular or non-circular. The first engagement strip also has an attachment tab extending from the cord portion that is coextensive with the cord portion. The attachment tab is connected to the first side of the filter sheet along the entire length of the first side of the filter sheet.

The system includes a second engagement strip extending along the second side of the filter sheet from the first end to the second end. The second engagement strip also has a cord portion located adjacent the second side of the filter sheet and extending outwardly from the second edge. Again, the cord portion has cross sectional shape that may be circular or non-circular. The second engagement strip likewise has an attachment tab extending from the cord portion and coextensive therewith. The attachment tab is connected to the second side of the filter sheet along the entire length of the second side of the filter sheet.

The system includes a first connecting strip receiving the first engagement strip, and a second connecting strip receiving the second engagement strip. The first and second connecting strips each include an outer surface and an inner surface, the inner surface defining a receiving portion configured to receive the cord portion and a body portion configured to engage an annular frame member. The receiving portion has a connecting ridge extending upwardly from the inner surface and a terminal end defining a receiving space with a cross sectional shape corresponding to the cross section of the cord portion. In embodiments where the cord portions have a circular cross sectional shape, the receiving portion has a generally C-shaped receiving space. The connecting ridge and the terminal end define a separation space separating the terminal end from the connecting ridge. The separation space receives a portion of the attachment tab adjacent the cord portion.

The first connecting strip is configured to be attached along a first circumferential edge of a first annular frame member of the plurality of frame members. Similarly, the second connecting strip is configured to be attached along a second circumferential edge of a second annular frame member of the plurality of frame members. In certain embodiments, the body portion of each connecting strip extends outwardly from the connecting ridge and terminates in a downwardly facing lip. In these embodiments both the outer surface of the body portion and the downwardly facing lip configured to engage a circumferential edge of the annular frame member. When the first and second engagement strips are fully received in the first and second connecting strips, the filter media extends between the first annular frame member and second annular frame member and along the first and second circumferential edges to enclose a first cylindrical filter space.

The system of the present application may further include a handle attached to one of the first end or the second end of the filter media sheet at a location equidistant between the first side and the second side. The handle allows a technician to move the first and second engagement strips through the first and second connecting strips such that the filter media extends between the first annular frame member and second annular frame member and along the first and second circumferential edges to enclose the first cylindrical filter space.

The system of the present application may also include a clamping rail for clamping the first end of the filter sheet to the second end of the filter media sheet when the filter media sheet encloses the first cylindrical filter space. The clamping rail includes a bottom arm hingedly connected to a top arm at a hinge located at a first end of the clamping rail. The top arm includes a locking handle located at a second end of the clamping rail. The locking arm engages with a locking mechanism located on the second ends of the top arm and the bottom arm and is configured to lock the top rail to the bottom rail. In this manner, the top rail and the bottom rail are generally parallel to one another with the first end and the second end of the filter sheet secured between the top arm and the bottom arm to seal the first cylindrical filter space.

The filter media of the present application provides many benefits. From a technical performance, the filter media of the present application makes contact with the filter frame firmly and securely ensuring that the media fits tightly against the filter frame to prevent dust-laden air from escaping before being properly filtered. The filter media of the present application also eliminates the use of the tensioning strap used with conventional filter media. The filter media of the present application lowers the risk of injury for fitters because it no longer requires the use of nails and self-drilling screws. The filter media of the present application eliminates the use of various tools and a ladder that fitters need to use in with the old model reducing installation time by about 75%. The filter media of the present application thus reduces the amount of manpower needed to replace the filter, as only one person is needed to do the replacement. With a quicker installation time, the filter media of the present application reduces the amount of downtime on the equipment, allowing the system to be back running in a quicker timeframe and increasing productivity. This reduces the overall maintenance costs of the filter system. Accordingly, the new design of the filter system, with the addition of quick-release clamps, provides a simpler, safer, faster way to replace the filter media. The process of replacement eliminates the use of tools, ladders and lifts, thus eliminating the need for more than one person to facilitate. The filter is self-sealing without the use of bands which ensures higher efficiency during operation.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure is described with reference to the following Figures. The same numbers are used throughout the Figures to reference like features and like components.

FIG. 1 is a perspective view of the drum filter system that the filter media of the present application is used with.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different methods and assemblies described herein may be used alone.

Figure 1:
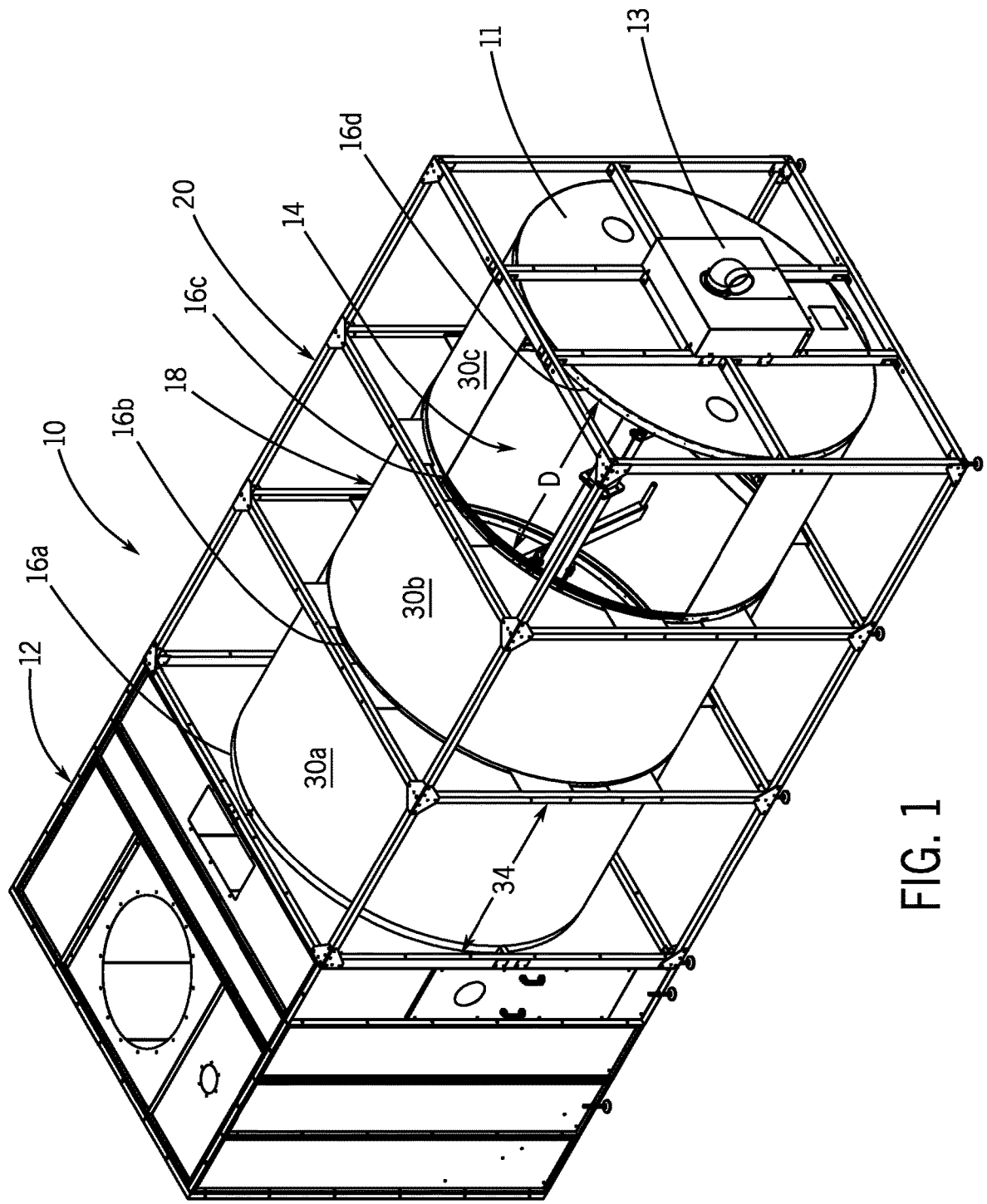

Referring first to FIG. 1, a cylindrical drum filter defining a filter system 10 is shown. The cylindrical drum filter 10 includes a plurality of annular frame members 16 defining a cylindrical periphery 18 and an inner cylindrical filter space 14. The plurality of annular members 16 are coaxially spaced from one another by a distance (D). It is noted that the distance (d) my be the same or may vary between annular members 16. The present application is designed to operate with any distance D. The plurality of annular frame members 16 are supported within a generally rectangular outer frame structure 20. The outer frame structure 20 permits the inner cylindrical filter space 14 to be connected with several components well known to those of ordinary skill in the art, including suction fans 11, exhaust fans 13, a pre-filter unit 12 for extracting dust from large air volumes prior to entering an inner cylindrical filter space 14 along with misting systems contained in the pre-filter unit 12 to saturate the air being cleaned; a compacting power screw (not shown) for compacting and discharging fine dust and material with short fibers without letting those substances contaminate the surrounding area; a fiber compactor (not shown) for paper and plastic waste; and high efficiency cyclone separators (not shown) for creating a rotating airflow (vortex) to separate dust particles.

Figure 2:
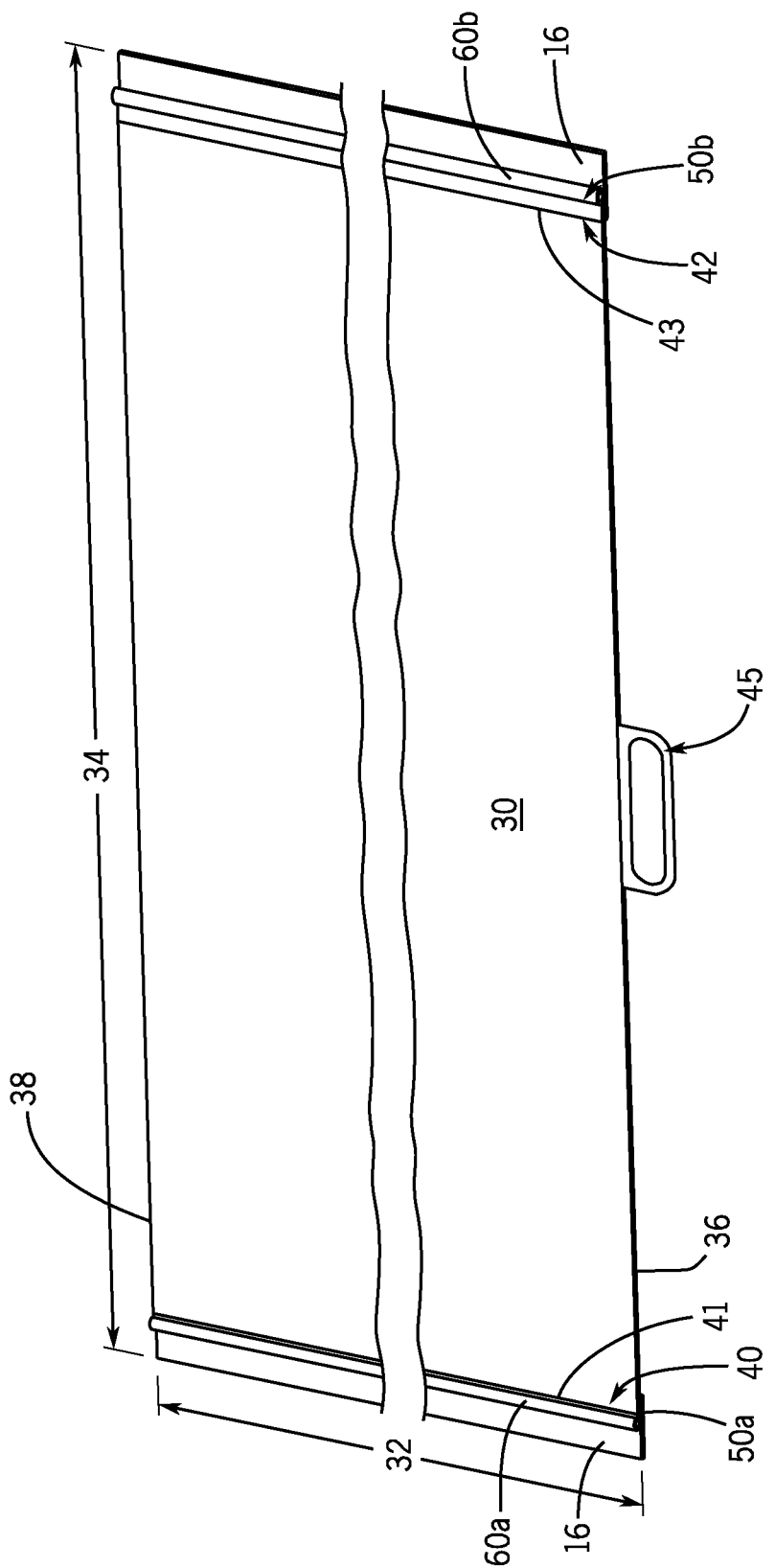
FIG. 2 is a perspective view of a filter sheet for use with the filter media of the present application.

Referring to FIGS. 1 and 2, a filter sheet 30 has a length dimension 34 and a width dimension 32. The length dimension 32 has a first end 36 and a second end 38. The width dimension 34 has a first side 40 and a second side 42. The first side 40 defines a first edge 41 and the second side 42 defines a second edge 43. The width dimension 34 approximates the distance D between the coaxially spaced annular frame members 16. The length dimension 32 approximates the circumference of the annular frame members 16. Accordingly, the filter media sheet 30 is configured to span the distance D between two coaxially spaced annular frame 16 members to enclose the inner cylindrical filter space 14 defined by the circumference of the plurality of annular frame members 16. As shown in FIG. 2, the filter sheet 30 may include a handle 45 attached to and end of the filter media sheet. FIG. 2 shows that the handle 45 is attached to the first end 36 of the filter media sheet 30 at a location equidistant between the first side 40 and the second side 42. Alternatively handles 45 may be located on the second end 38 of the filter media sheet 30, or on both ends 36 and 38. While the central location between sides 40 and 42 is preferred, the handles 45 may be located at any location along the width 34 of the filter media sheet 30, and multiple handles 45 may be included on any end 36 or 34. The handle 45 is configured to allow a technician to move the filter media 30 along the circumference of the \ annular frame members 16 to enclose the first cylindrical filter space 14, as will be further described herein.

Figure 3:
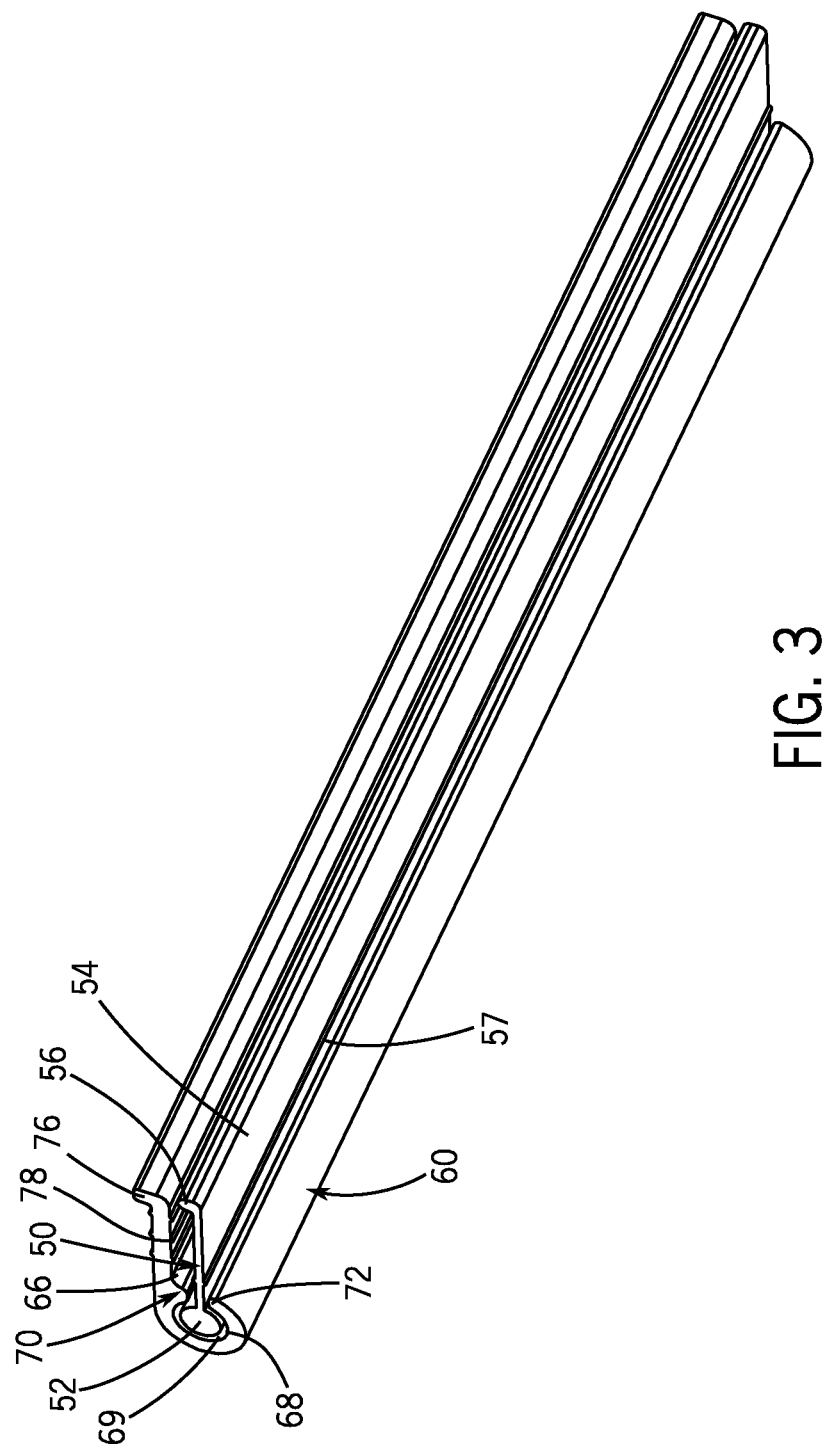
FIG. 3 is a perspective view of the engagement strip and connecting strip for use with the filter media of the present application.
Figure 4:
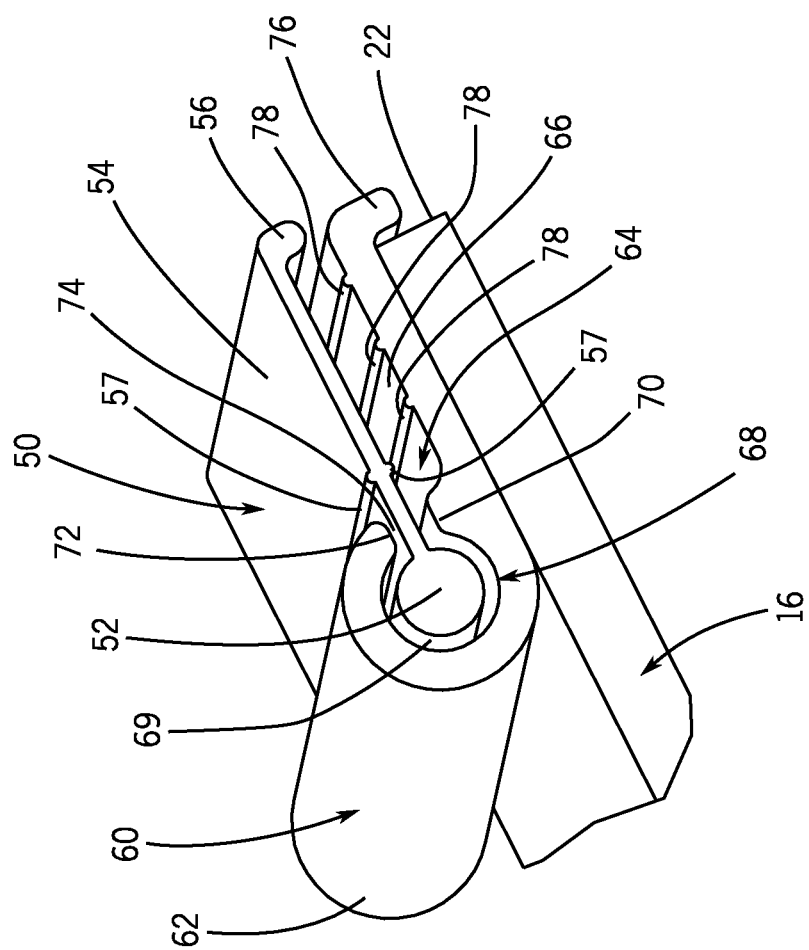
FIG. 4 is a perspective view of the engagement strip and connecting strip attached along the first circumferential edge of a first annular frame member.
Figure 5:
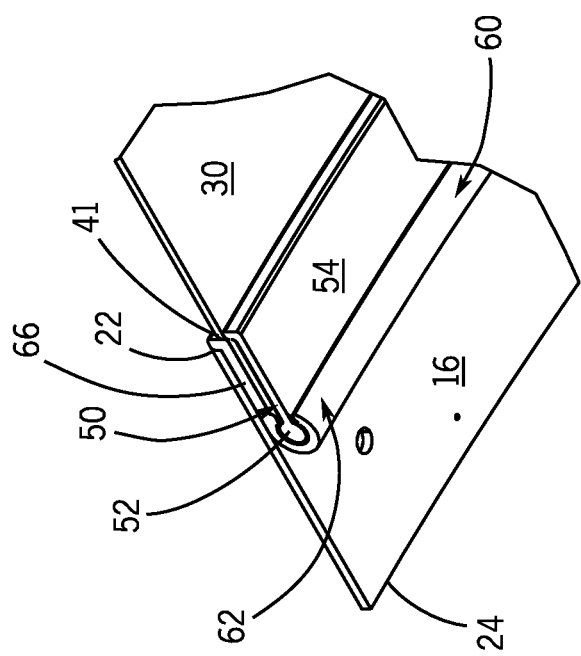
FIG. 5 is a perspective view of the engagement strip and connecting strip attached along the first circumferential edge of a first annular frame member further demonstrating the filter sheet extending from the engagement strip.

Referring now to FIGS. 2 through 5, each of the first side 40 and the second side 42 of the filter sheet 30 includes an engagement strip 50 extending along the side 40, 42 of the filter sheet 30 from the first end 36 to the second end 38. Referring now to FIGS. 3 through 5, each engagement strip 50 has a cord portion 52 located adjacent a side 41, 43 of the filter sheet 30. The cord portion 52 extends outwardly from each edge 41, 43 and has a circular cross section in one embodiment. It should be noted however, that the cross sectional shape of the cord portion 52 may take any shape, whether triangular, rectangular, or otherwise non-circular. The engagement strips 50 also include an attachment tab 54 extending coextensively from the cord portion 52. The attachment tab 54 is connected to a side 40, 42 of the filter sheet 30 along the entire length 32 of each side 40, 42 of the filter sheet 30. In certain embodiments the attachment tab 54 may include a downwardly extending flange 56. In other embodiments, the attachment tab may include one or more ridges 57 on either the top or bottom surface. Accordingly, a filter sheet 30 of the present application will include a first engagement strip 50a extending along the length 32 of the first side 40, and a second engagement strip 50b extending along the length 32 of the second side 42. In this manner, a cord portion 52 is provided outwardly of each edge 41, 43 along the entire length 32 of each side 40, 42 of the filter media sheet 30.

Still referring to FIGS. 2 through 5, each engagement strip 50 is configured to be received into a respective connecting strip 60. As shown in FIG. 4, the connecting strips 60 each include an outer surface 62 and an inner surface 64. The inner surface 64 defines a receiving portion 68 configured to receive the cord portion 52 and a body portion 66 configured to engage an annular frame member 16. The receiving portion 68 has a connecting ridge 70 extending upwardly from the inner surface 64 and a terminal end 72 defining a generally C-shaped receiving space 69 within the receiving portion 68. While the embodiment shown demonstrates a C-shaped receiving space 69, the receiving space 69 may be of any shape such that it corresponds with the cross sectional shape of the cord portion 52. The connecting ridge 70 and the terminal end 72 define a separation space 74 separating the terminal end 72 from the connecting ridge 70. The separation space 74 receives a portion of the attachment tab 54 adjacent the cord portion 52. The body portion 66 of the connecting strip 60 extends outwardly from the connecting ridge 70 and terminates in a downwardly facing lip 76. The inner surface 64 of the body portion 66 may include additional ridges 78. As demonstrated in FIG. 4, the outer surface 62 of the body portion 66 and the downwardly facing lip 76 are configured to engage a circumferential edge 22 of an annular frame member 16.

Referring now to FIGS. 4 and 5, each annular frame member 16 has a circumference with a first circumferential edge 22 and a second opposed circumferential edge 24. The connecting strip 60 is configured to be attached along both the first circumferential edge 22 and the second circumferential edge 24 of the annular frame members 16. Each connecting strip 60 can then receive a respective engagement strip 50. As will be recognized by those of ordinary skill in the art, the annular frame members 16 located at the ends of the cylindrical drum filter 10 will require only one connecting strip 60 on the circumferential edges 22 or 24 facing toward the inner cylindrical filter space 14 to receive one engagement strip 50. The annular frame members 16 spaced coaxially from the end members will have a first connecting strip 60a attached to a first circumferential edge 22 of a first annular frame member 16 and a second connecting strip 60b attached to a second edge 24 of a second annular frame member 16. When first and second engagement strips 50a, 50b are fully received in the first and second connecting strips 60a, 60b, the filter sheet 30 extends the distance D between the two annular frame members 16 and along the first and second circumferential edges 22, 24 to enclose a cylindrical filter space 14. The handle 45 may be used to facilitate the threading of the engagement strips 50 through the connecting strips 60 to move the filter sheet 30 around the entire circumference of cylindrical filter space 14.

In the embodiment shown in FIG. 1, three filter sheets 30a, 30b and 30c operate to enclose the cylindrical filter space 14 of the cylindrical drum filter 10. The first filter sheet 30a will have a first engagement strip 50a along a first side 40 that engages with a connecting strip 60a located on terminal annular frame member 16a located adjacent to the pre-filter unit 12. Since the annular frame member 16a is a terminal annular frame member, it receives only one connecting strip 60 along its inwardly facing circumferential edge 22. The first filter sheet 30a will also have a second engagement strip 50b along a second side 42 that engages with a connecting strip 60b located on annular frame member 16b at the circumferential edge 24 facing toward annular frame member 16a. In a similar fashion, filter sheet 30b will have a first engagement strip 50a along a first side 40 that engages with a connecting strip 60a located on annular frame member 16b at the circumferential edge 22 facing toward annular frame member 16c. The second filter sheet 30b will also have a second engagement strip 50b along a second side 42 that engages with a connecting strip 60b located on annular frame member 16c at the circumferential edge 24 facing toward annular frame member 16b. Filter sheet 30c will also have a first engagement strip 50a along a first side 40 that engages with a connecting strip 60a located on annular frame member 16c at the circumferential edge 22 facing toward terminal annular frame member 16d. The second filter sheet 30b will also have a second engagement strip 50b along a second side 42 that engages with a connecting strip 60b located on terminal annular frame member 16d at the circumferential edge 24 facing toward annular frame member 16c. Since the annular frame member 16d is a terminal annular frame member, it receives only one connecting strip 60 along its inwardly facing circumferential edge 24. In this manner the entire cylindrical filter space 14 defined by the series of coaxially spaced annular rings 16a-16d is enclosed by filter media. It will be recognized by those of ordinary skill in the art that additional annular frame members may be added to the design to expand the size of the cylindrical filter space 14. Likewise, one or more annular frame members may be removed to reduce the size of the cylindrical filter space 14. The present application is designed to operate with any number of annular frame members 16 such that the filter media of the present application operates with may different sized drum filters 10.

Figure 6:
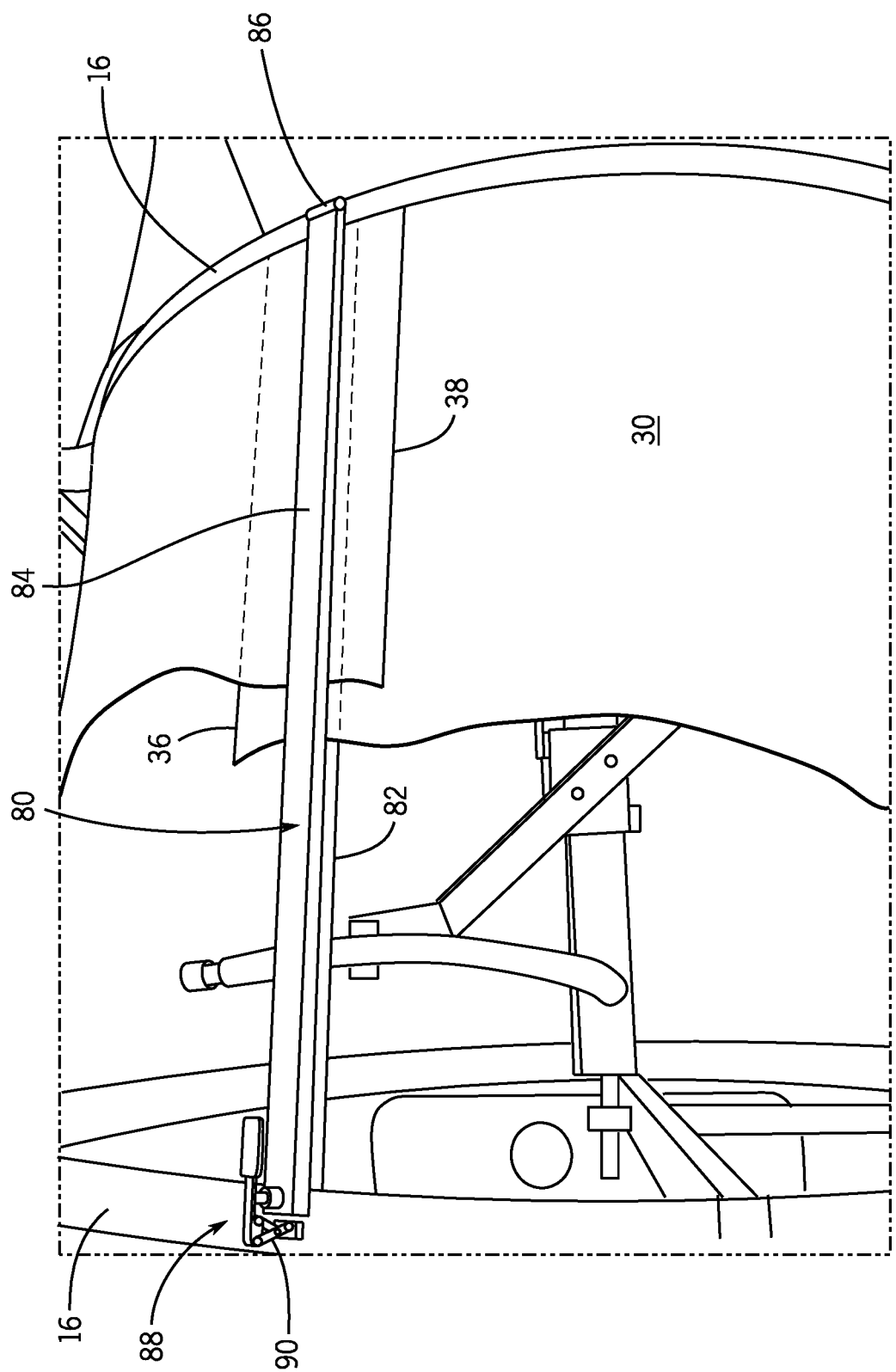
FIG. 6 is a perspective view of the clamping rail of the present application for clamping the first end of the filter sheet to the second end of the filter media sheet.

Referring now to FIG. 6, located between each annular member 16 is a clamping rail 80 for clamping the first end 36 of the filter sheet 30 to the second end 38 of the filter sheet 30 when the filter media sheet 30 encloses a cylindrical filter space 14, as described above. The clamping rail 80 includes a bottom arm 82 hingedly connected to a top arm 84 at a hinge 86 located at a first end of the clamping rail 80. The hinged connection may be secured, either removably or non-removably, to one annular member 16. The length of the clamping rail 80, including the length of arms 82, and 84 spans the distance D between two coaxially spaced annular members 16. The top arm 84 includes a locking handle 88 located at a second end of the clamping rail 80, the locking handle 88 engaging with a locking mechanism 90 located on the second ends of both of the top arm 84 and the bottom arm 82. The interaction between the locking handle 88 and the locking mechanism 90 operates to lock the top rail 84 to the bottom rail 82 such that the top rail 84 and the bottom rail 82 are generally parallel to one another. In operation, once a the engagement strips 50 are fully received in the connecting strips 60 such that the filter sheet 30 extends the distance D between two annular frame members 16 and along the first and second circumferential edges 22, 24 to enclose a cylindrical filter space 14, the first end 36 and the second end 38 of the filter sheet 30 overlap one another and are secured between the top arm 84 and the bottom arm 82 of the clamping rail 80 to seal the first cylindrical filter space 14.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A filter media for a drum filter, the filter media comprising:
   a filter sheet having a length dimension and a width dimension, the length dimension having a first end and a second end, the width dimension having a first side and a second side;
   a first engagement strip extending along the first side of the filter sheet between the first end and the second end, the first engagement strip having a cord portion and an attachment tab extending from the cord portion, the attachment tab connected to the first side of the filter sheet;
   a second engagement strip extending along the second side of the filter sheet between the first end and the second end, the second engagement strip having a cord portion and an attachment tab extending from the cord portion, the attachment tab connected to the second side of the filter sheet;
   a first connecting strip configured to receive the first engagement strip, the first connecting strip having a receiving portion receiving the cord portion of the first engagement strip and a body portion configured to engage a drum filter frame;
   second connecting strip configured to receive the second engagement strip, the second connecting strip having a receiving portion receiving cord portion of the second engagement strip and a body portion capable of engaging the drum filter frame.

2. The filter media of claim 1, wherein the width dimension of the filter sheet approximates a distance between annular frame members of the drum filter.

3. The filter media of claim 1, wherein the length dimension of the filter sheet approximates a circumference of the annular frame members of the drum filter.

4. The filter media of claim 1, wherein the first and second sides of the filter sheet have a first edge and second edge and the cord portions of the first and second engagement strips extends outwardly from the first and second edges, respectively.

5. The filter media of claim 1, wherein the cord portions have a non-circular cross sectional shape.

6. The filter media of claim 1, wherein the cord portions have a circular cross sectional shape.

7. The filter media of claim 6, wherein the receiving portions of the first and second connecting strips have an inner surface and an outer surface and the receiving portions further comprise a connecting ridge extending upwardly from the inner surface and a terminal end defining a generally C-shaped receiving space with a cross sectional shape corresponding to the cross sectional shape of the cord portion.

8. The filter media of claim 7, wherein the connecting ridge and the terminal end define a separation space separating the terminal end from the connecting ridge, the separation space receiving a portion of the attachment tab adjacent the cord portion.

9. The filter media of claim 1, wherein the body portion of the first and second connecting strips have a downwardly facing lip configured to engage a circumferential edge of an annular frame member the drum filter frame.

10. The filter media of claim 1 further comprising a handle attached to one of the first end or the second end of the filter media sheet, the handle configured to allow a technician to move the first and second engagement strips through the first and second connecting strips.

11. The filter media of claim 10, wherein the handle is attached at a location equidistant between the first side and the second side.

12. A system for attaching a filter media to a cylindrical drum filter, the drum filter comprising a plurality of annular frame members, each annular frame member having a circumference with a first circumferential edge and a second opposed circumferential edge, the plurality of annular members being coaxially spaced from one another by a distance, the plurality of annular frame members defining a cylindrical periphery and an inner cylindrical filter space, the filter medial comprising:
   a filter sheet having a length dimension and a width dimension, the length dimension having a first end and a second end, the width dimension having a first side and a second side, the first side defining a first edge and the second side defining a second edge, wherein the width dimension approximates the distance between the annular frame members, and the length dimension approximates the circumference of the annular frame members such that the filter media sheet is configured to span the distance between two coaxially spaced annular frame members to enclose the inner cylindrical filter space;
   a first engagement strip extending along the first side of the filter sheet from the first end to the second end, the first engagement strip having a cord portion located adjacent the first side of the filter sheet and extending outwardly from the first edge, the cord portion having a cross sectional shape, the first engagement strip further defining an attachment tab extending from the cord portion and coextensive therewith, the attachment tab connected to the first side of the filter sheet along the entire length of the first side of the filter sheet;
   a second engagement strip extending along the second side of the filter sheet from the first end to the second end, the second engagement strip having a cord portion located adjacent the second side of the filter sheet and extending outwardly from the second edge, the cord portion having cross sectional shape, the second engagement strip further defining an attachment tab extending from the cord portion and coextensive therewith, the attachment tab connected to the second side of the filter sheet along the entire length of the second side of the filter sheet;

a first connecting strip receiving the first engagement strip, and a second connecting strip receiving the second engagement strip, wherein the first and second connecting strips each include an outer surface and an inner surface, the inner surface defining a receiving portion configured to receive the cord portion and a body portion configured to engage an annular frame member;

the receiving portion having a connecting ridge extending upwardly from the inner surface and a terminal end defining a receiving space with a cross sectional shape corresponding to the cross section of the cord portion, the connecting ridge and the terminal end defining a separation space separating the terminal end from the connecting ridge, the separation space receiving a portion of the attachment tab adjacent the cord portion;

wherein the first connecting strip is configured to be attached along a first circumferential edge of a first annular frame member of the plurality of frame members, and the second connecting strip is configured to be attached along a second circumferential edge of a second annular frame member of the plurality of frame members such that when the first and second engagement strips are fully received in the first and second connecting strips, the filter media extends between the first annular frame member and second annular frame member and along the first and second circumferential edges to enclose a first cylindrical filter space.

13. The system of claim 12, wherein the cord portions have a circular cross sectional shape and the receiving portion has a generally C-shaped receiving space with a cross section corresponding to the cross sectional shape of the cord portion.

14. The system of claim 12, wherein the cord portions have a non-circular cross sectional shape.

15. The system of claim 12, wherein the body portion of each connecting strip extends outwardly from the connecting ridge and terminates in a downwardly facing lip, the outer surface of the body portion and the downwardly facing lip configured to engage a circumferential edge of the annular frame member.

16. The system of claim 12, further comprising a handle attached to one of the first end or the second end of the filter media sheet at a location equidistant between the first side and the second side, the handle configured to allow a technician to move the first and second engagement strips through the first and second connecting strips such that the filter media extends between the first annular frame member and second annular frame member and along the first and second circumferential edges to enclose the first cylindrical filter space.

17. The system of claim 12, further comprising a clamping rail for clamping the first end of the filter sheet to the second end of the filter media sheet when the filter media sheet encloses the first cylindrical filter space, the clamping rail including a bottom arm hingedly connected to a top arm at a hinge located at a first end of the clamping rail, the top arm including a locking handle located at a second end of the clamping rail, the locking arm engaging with a locking mechanism located on the second ends of the top arm and the bottom arm and configured to lock the top rail to the bottom rail such that the top rail and the bottom rail are generally parallel to one another with the first end and the second end of the filter sheet secured between the top arm and the bottom arm to seal the first cylindrical filter space.

* * * * *